United States Patent [19]

Gerber

[11] 4,290,670
[45] Sep. 22, 1981

[54] OPTICAL RECEIVER/TRANSMITTER SYSTEM EMPLOYING A COMMON OPTICAL APERTURE

[75] Inventor: Wesley D. Gerber, Mission Diejo, Calif.

[73] Assignee: Ford Aerospace & Communications Corp., Detroit, Mich.

[21] Appl. No.: 81,718

[22] Filed: Oct. 3, 1979

[51] Int. Cl.³ .................. G05D 25/00; G01C 3/08; G02B 7/88
[52] U.S. Cl. ..................... 350/274; 350/34; 350/275; 356/4; 356/5
[58] Field of Search .............. 350/274, 275, 34; 356/4, 5, 28, 28.5

[56] References Cited

U.S. PATENT DOCUMENTS

| | | | |
|---|---|---|---|
| 3,533,707 | 10/1970 | Weiss | 350/34 |
| 3,619,058 | 11/1971 | Hewlett et al. | 356/5 |
| 3,752,587 | 8/1974 | Myers et al. | 356/153 |
| 4,139,769 | 2/1979 | McCrum et al. | 250/341 |

Primary Examiner—S. C. Buczinski
Attorney, Agent, or Firm—Paul K. Godwin, Jr.; Clifford L. Sadler

[57] ABSTRACT

A system for alternately projecting and receiving electromagnetic radiation through a single optical aperture. A source of radiation emits radiation that is focused onto a rotating gating means which is synchronously timed with said source emissions. The gating means acts to reflect radiation received from a distant target through the optical aperture during the off time of the source towards a radiation detector.

7 Claims, 1 Drawing Figure

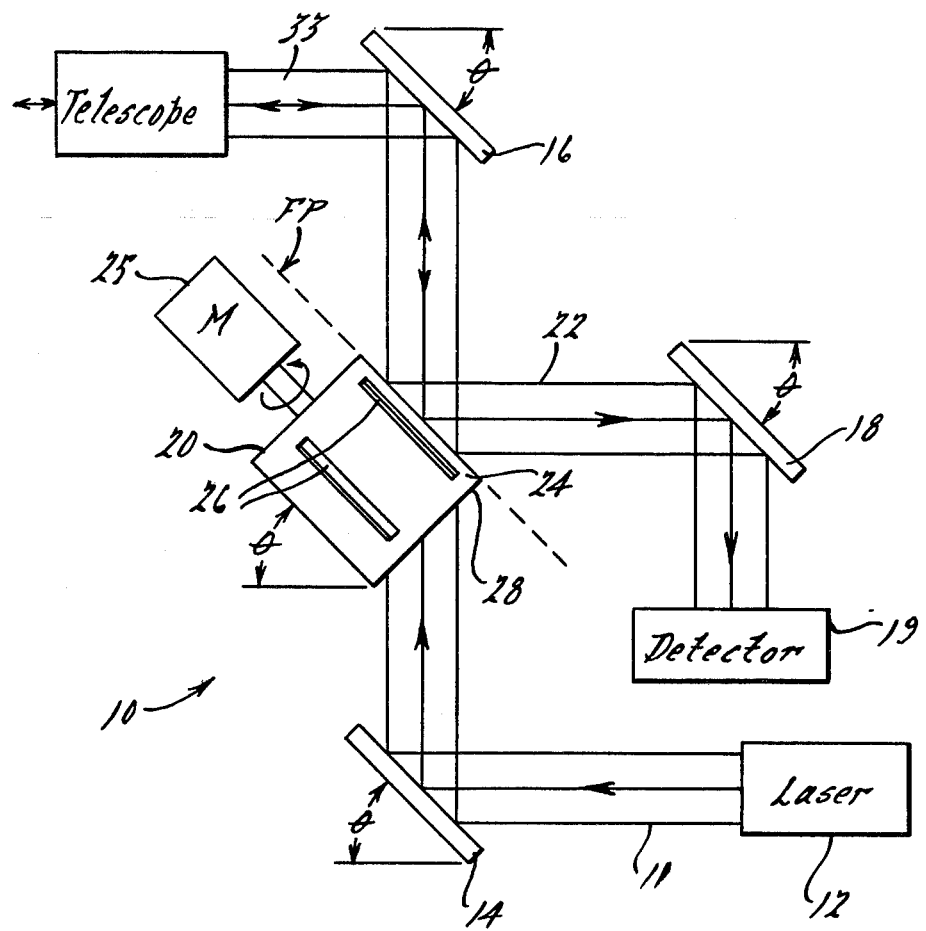

OPTICAL RECEIVER/TRANSMITTER SYSTEM EMPLOYING A COMMON OPTICAL APERTURE

BACKGROUND OF THE INVENTION

1. Field of the Invention

The present invention is directed to optical receiver/transmitter systems and more specifically to those systems which employ a common optical aperture.

2. Description of the Prior Art

Target designation systems that are commonly found in military type aircraft, often employ dual aperture optical systems. In such systems, a beam is transmitted towards the target via one optical system and a receiving telescope is parallelly aligned therewith to define a second optical system.

In commonly assigned U.S. Pat. No. 4,139,769 a dual optical system is shown, whereby an infrared detector employs an optical telescope aligned with a parallelly directed laser beam. Of course, such systems require sophisticated boresighting apparatus in order to insure that the telescope and laser beam axes converge at the same point on a target.

SUMMARY OF THE INVENTION

The present invention is intended to be useful for target designation systems or in any other system where it is desirable to employ a single optical axis for both transmission and reception of electromagnetic radiation.

It is another object of the present invention to provide a mechanism that gates radiation, for transmission along the single optical axis over a first predetermined period of time, and redirects received energy from the same optical axis to a detection system.

BRIEF DESCRIPTION OF THE DRAWINGS

The FIGURE is a schematic layout illustrating a preferred embodiment of the invention.

DETAILED DESCRIPTION OF THE PREFERRED EMBODIMENT

The system shown in the drawing is designated as 10 and functions to alternately project and receive electromagnetic radiation through a single common optical aperture.

The system 10, in this case, includes a high energy laser generator 12 which emits a beam of coherent radiation collimated along a first path 11. The cross-sectional area of the beam traveling in the first path 11 is focused by cylindrical mirror optical element 14, which is oriented at an angle $\theta$ with respect to the first path 11. The beam traveling along the first path 11 is redirected by the cylindrical optical element 14 and is focused along a line coincident to a focal plane designated "FP".

An optical gating cylinder 20, having an open end 28, is located to interrupt the focused beam from the optical element 14 and contains a plurality of apertures 26 equally spaced around the surface 24 of the cylinder. Each of the apertures is formed to pass the focal plane radiation and oriented to be coincident with the beam image focused at the focal plane FP. The radiation from the optical element 14 enters the open end of the cylinder 28 and is focused through an aperture 26 upon the focal plane tangent with the external surface of the cylinder. In the system 10, the laser 12 is pulse modulated in synchronization with the rotating apertures 26 being located at the focal plane to allow gating of the high energy laser beam therethrough. The gating cylinder 20 is driven by a synchronous motor 25. When any one of the apertures 26 is located at the focal plane FP and gates through the focused beam image, the beam traverses the aperture and expands.

A cylindrical mirror optical element 16, also oriented at an angle $\theta$ with respect to the first path 11 direction, collimates the emitted gated beam and directs it along a common path 33 parallel to the first path 11. The collimated beam directed along common path 33, is transmitted by a common optical aperture, which in this embodiment is a telescope lens sytem, towards a designated target.

Immediately subsequent to the gating and transmission of the high energy laser beam by the system 10, the reflective outer surface 24 of the cylinder 20 rotates into the focal plane FP. Therefore, radiation which is reflected by the target and received by the telescope is directed along the common optical path 33 towards the optical element 16 and focused at the focal plane FP on the outer reflective surface 24 of the cylinder 20. The reflective outer surface 24 of the cylinder 20 constitutes a negative cylindrical reflective element, which redirects the received focused energy along a second optical path 22 toward a cylindrical mirror optical element 18. The optical element 18 is also oriented at an angle $\theta$ with respect to the second beam path 22 direction and collimates the received energy onto a detector element 19.

In this embodiment, the optical elements 14, 16 and 18 are shown arrayed in a planar geometry and positioned appropriately around the rotating gating cylinder 20 in such a manner as to commonly locate their focal planes coincident with a plane formed on the external surface 24 of the cylinder 20. Each of the optical elements 14, 16 and 18, therefore, create a line focus superimposed upon that of the others at the surface of the rotating cylinder 20 and parallel to the axis of the gating cylinder's rotation.

In alternative embodiments, the optical elements may be selected to provide either afocal or focal operation. The arrangement can be made to permit the capability of providing astigmatic magnification to correct for beam energy distribution, if desired, wherein a magnification occurs in one axis while there is no magnification in the transverse axis. Corrections for the beam may be provided through proper orientation and selection of these components.

Other embodiments are also envisioned whereby the above described gating system may be used to transmit two alternately generated beams of radiation or to alternately receive two separate frequencies of radiation from a target.

It will be apparent that many modifications and variations may be effective without departing from the scope of the novel concept of this invention. Therefore, it is intended by the appended claims to cover all such modifications and variations which fall within the true spirit and scope of the invention.

I claim:

1. A system for alternately projecting and receiving electromagnetic radiation through a single optical aperture comprising:
    means for emitting a beam of electromagnetic radiation along a first optical path;
    first means for focusing said beam at a focal plane along the first optical path;

means at said focal plane for gating said focused beam for a first predetermined period of time;

second means for collimating said gated beam towards said optical aperture for projection thereby and for focusing radiation received by said optical aperture to said focal plane;

said gating means includes a negative cylinder reflector element for reflecting said focused received radiation at said focal plane along a second optical path for a second predetermined period of time subsequent to said first predetermined period of time;

third means located along said second optical path for collimating said reflected received radiation; and means for detecting said received radiation from said third means.

2. A system as in claim 1, wherein said first, second and third means are cylindrical optical elements and said emitted radiation and received radiation are focused along a common line in said focal plane.

3. A system as in claims 1 or 2 wherein said gating means is a hollow right circular cylinder mounted for rotation about its circular axis parallel to said focal plane, having at least one aperture formed therein in the cross-sectional shape of said focused beam to allow said beam to be gated therethrough when they are coincident.

4. A system as in claim 3, wherein said gating means cylinder has an opening at one end to allow said focused beam to enter the internal portion of said hollow cylinder toward said focal plane.

5. A system as in claim 4, wherein said gating means reflector element is on the outer surface of said rotatable cylinder interrupted by said at least one aperture.

6. A system as in claim 5, wherein said emitted beam is a high energy laser beam, said optical aperture is a telescope for directing said gated high energy laser beam onto a target, and said received radiation is that which is from said target and received by said telescope.

7. An optical receiver/transmitter system employing a common receive/transmit optical aperture comprising:

a source of electromagnetic radiation for emitting radiation directed along a first path;

an electromagnetic radiation detector for receiving radiation directed along a second path;

said first path and said second path intersect at a predetermined point;

means located at said intersection of said first and second paths to gate said emitted radiation, directed along said first path, over a first predetermined period of time along a third path toward said common receive/transmit optical aperture for transmission by said system;

said gating means further functions to direct radiation, received by said common receive/transmit optical aperture and directed along said third path, along said second path toward said detector over a second predetermined period of time separate from said first period; and wherein said gating and directing means is in the form of a hollow cylinder having a polished outer surface for reflecting received radiation and at least one aperture therein for allowing said emitted radiation to pass through said cylinder during said first predetermined period of time.

* * * * *